(12) United States Patent
Tiecher (10) Patent No.: US 12,213,492 B2
(45) Date of Patent: Feb. 4, 2025

(54) MACHINE AND METHOD FOR CLEANING POULTRY OFFAL

(71) Applicant: Mauro Tiecher, Chapecó (BR)

(72) Inventor: Mauro Tiecher, Chapecó (BR)

( * ) Notice: Subject to any disclaimer, the term of this patent is extended or adjusted under 35 U.S.C. 154(b) by 0 days.

(21) Appl. No.: 18/009,038

(22) PCT Filed: Jan. 1, 2021

(86) PCT No.: PCT/BR2021/050001
§ 371 (c)(1),
(2) Date: Dec. 8, 2022

(87) PCT Pub. No.: WO2022/040764
PCT Pub. Date: Mar. 3, 2022

(65) Prior Publication Data
US 2024/0284923 A1    Aug. 29, 2024

(30) Foreign Application Priority Data

Aug. 24, 2020 (BR) ...................... 10 2020 017280 8

(51) Int. Cl.
A22C 21/00    (2006.01)
(52) U.S. Cl.
CPC .............................. *A22C 21/0061* (2013.01)
(58) Field of Classification Search
CPC ..... A22C 21/0061; A22C 21/06; A22C 17/16; A22B 5/18

(Continued)

(56) References Cited

U.S. PATENT DOCUMENTS 3,689,961 A * 9/1972 Crane .................... A22C 21/06
452/118
3,711,897 A * 1/1973 Viscolosi ............... A22C 21/06
452/118

(Continued)

FOREIGN PATENT DOCUMENTS

BR            8203073       8/2004
BR            PI0701761     3/2008

(Continued)

OTHER PUBLICATIONS

International Search Report for PCT/BR2021/050001 dated Apr. 29, 2021.

*Primary Examiner* — Richard T Price, Jr.
(74) *Attorney, Agent, or Firm* — B. Aaron Schulman, Esq.; Stites & Harbison, PLLC (57) ABSTRACT

The present invention relates to an apparatus M for cleaning poultry giblets X. These giblets X enter the apparatus M through an inlet gutter M0 and are dispensed through an outlet gutter M6. The apparatus M comprises pre-cleaning rollers 3 and 4 arranged under a guiding assembly M1 that directs the giblets X to a gripping and transporting conveyor chain M2 for transporting the giblets X from the pre-cleaning rollers 3 and 4 to a pressing assembly M5, passing through a cutting element M3 and a washing assembly M4 for the giblets X. The apparatus M also comprises a gutter 6 that directs the giblets X to a cleaning system L installed transversely in the apparatus M, enabling the traction of these giblets X from the gutter 6 to the outlet gutter M6. In addition, the invention also describes a method for cleaning poultry giblets X, applied in the apparatus M.

15 Claims, 7 Drawing Sheets

(58) Field of Classification Search
USPC .......................................................... 452/123
See application file for complete search history.

(56) References Cited

U.S. PATENT DOCUMENTS

| | | | |
|---|---|---|---|
| 4,073,040 A | | 2/1978 | Hill |
| 4,527,304 A | | 7/1985 | Ullum |
| 4,748,722 A | * | 6/1988 | Risser .................... A22C 17/16 |
| | | | 452/111 |
| 5,041,053 A | * | 8/1991 | Ellis ....................... A22C 21/06 |
| | | | 452/120 |
| 8,439,730 B1 | | 5/2013 | Gasbarro |

FOREIGN PATENT DOCUMENTS

| | | |
|---|---|---|
| BR | MU8702054 | 8/2009 |
| BR | 202015018345 | 2/2017 |
| BR | 202016020834 | 3/2018 |
| BR | 202017012153 | 12/2018 |
| CN | 206821859 | 1/2018 |
| WO | WO0057072 | 12/2001 |

\* cited by examiner

MACHINE AND METHOD FOR CLEANING POULTRY OFFAL

BACKGROUND OF THE INVENTION

The present invention relates to an apparatus for cleaning poultry giblets, particularly used to promote the removal of residues from giblets, such as gizzards, hearts and/or similar, of birds larger than chickens, such as turkeys, ducks, or other larger slaughter birds. This apparatus is designed to perform cleaning more efficiently throughout the entire apparatus, also featuring an innovative cleaning assembly and a bearing adjustment system of the cleaning components of the apparatus. The invention also describes a method for cleaning poultry giblets, applied for cleaning giblets of larger size birds than chickens, such as giblets of turkeys, ducks, etc.

Apparatuses for poultry giblets processing are well known for those of ordinary skill in the art of poultry processing.

These apparatuses were developed to fulfill safety requirements, to avoid work accidents, as well as to reduce the need of manual labor during selection and cleaning of giblets from slaughtered birds, which are widely marketed in the food industry worldwide. Thus, for such giblets to be marketed properly and with increased added value, after the extraction of the giblets from the carcasses of slaughtered birds, the removal of residual parts attached to the giblets is necessary.

Initially, the processing of these giblets was performed manually by human labor, to clean each piece individually, resulting in low productivity, high rate of repetitive strain injuries (RSI), and work accidents.

Therefore, apparatuses were developed to automate poultry giblets processing, and the removal of residual parts of the giblets is usually performed by the rotation of cleaning rollers.

Some examples of apparatuses designed to fulfill different specific functions, within the scope of giblets processing, are presented by the Brazilian patent documents BRMU8203073-1, BR202015018345-9, BR202016020834-9, and BR202017012153-0, all owned by the same applicant of this invention. Such documents present specific improvements in the apparatuses and devices used for cleaning giblets.

Nevertheless, despite visible improvements in the automation of the giblets cleaning processes, the applicant, continuing his studies in the field, envisioned the possibility of developing an apparatus and a method for cleaning poultry giblets, providing a more efficient cleaning of giblets from birds larger than conventional chickens, such as turkeys and ducks, adapting an apparatus and a cleaning method that presents greater productivity and efficiency in cleaning this type of giblets.

Thus, disadvantageously, current apparatuses do not have efficient designs, capable of cleaning larger slaughtered birds, such as turkeys and ducks.

Furthermore, disadvantageously, current apparatuses have bearings positioned in hard-to-reach places, and it is often necessary to remove other components from the apparatus to access its bearings components. In addition, it is necessary to loosen and retighten several screws to perform the adjustment of each bearing.

In order to solve these inconveniences from the state of the art, the present invention proposes an apparatus and a method for cleaning poultry giblets, providing improved cleaning components associated with a more efficient cleaning assembly, for cleaning larger giblets, and also providing a system for adjusting bearings installed in positions with easy access in the apparatus.

Thus, it is an objective of the present invention to provide an apparatus and a method for cleaning poultry giblets, in which the cleaning assembly is installed orthogonally to the direction of the giblets processing flow in the apparatus, allowing the traction of these giblets in a more efficient cleaning flow.

In addition, it is also an objective of the present invention to provide an apparatus for cleaning poultry giblets, wherein bearings are installed in places not obstructed by other components of the apparatus where they are applied, allowing easy positioning adjustment of the bearing components in this apparatus, for different types of products/batches with different dimensional characteristics.

Advantageously, the present invention introduces an apparatus and a method for cleaning poultry giblets, with a simple and safe design, resulting in cleaned giblets with quality gains, in increasing productivity, and in preparations for operation and in maintenance with the possibility of precise adjustments of the apparatus elements.

Schematic drawings of a particular embodiment of the invention can herein be seen. The dimensions and proportions presented in these schemes are not necessarily the real ones, as the drawings are only intended to didactically present its various aspects. The scope of protection is determined only by the scope of this document claims.

DESCRIPTION OF THE INVENTION

As represented by the accompanying drawings, the apparatus M for cleaning poultry giblets is provided with an inlet gutter M0 and a giblet outlet gutter M6. Therefore, the giblets X enter the apparatus M through the inlet gutter M0, and the entire cleaning process is conducted inside the apparatus M. Afterwards, the giblets X are dispensed through the outlet gutter M6.

Said apparatus M comprises a first pre-cleaning roller 3 and a second pre-cleaning roller 4, responsible to perform an initial cleaning of the giblets X, promoting the separation of the giblets viscera package (not shown) as soon as they enter the apparatus M through the inlet gutter M0. Thus, automatically, only the giblets X without viscera (not shown) continue in the cleaning process performed by the apparatus M.

The beforementioned pre-cleaning rollers 3 and 4 are arranged under a guiding assembly M1, directing the giblets X to a gripping and transporting conveyor chain M2 for transporting the giblets X from the pre-cleaning rollers 3 and 4 to a pressing assembly M5, passing through a cutting element M3 and a washing assembly M4 for giblets X.

Figure 13:
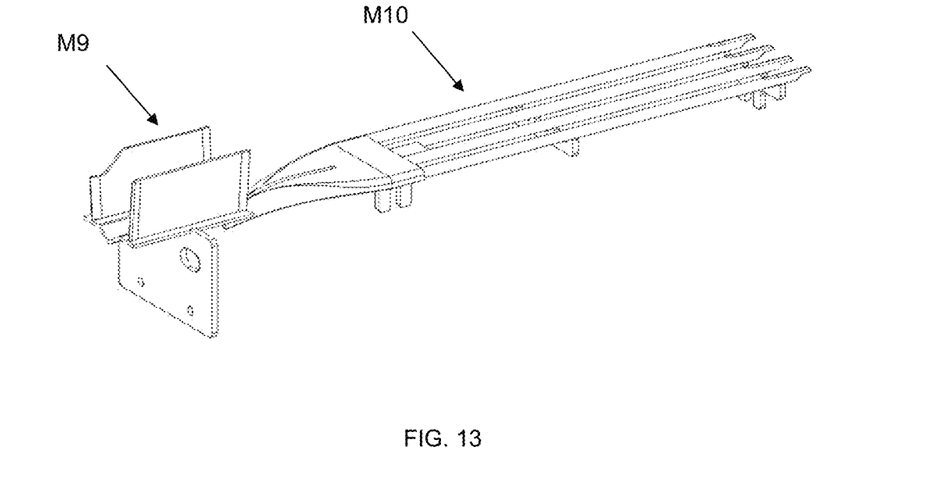
FIG. 13 shows a perspective view of the opening and cleaning guide M10 and the opening gutter M9

As illustrated in FIG. 13, an opening and cleaning guide M10 and the opening gutter M9 of the giblets X is applied under the gripping and transporting conveyor chain M2, in such a way that during the transport of the giblets X by the gripping and transporting conveyor chain M2, the opening and cleaning guide M10 and the opening gutter M9 allow convenient cutting and opening of the giblets X, after passing through the cutting element M3, so the giblets can be cleaned more efficiently, while they cross the washing assembly M4 and the opening and cleaning guide M10.

Figure 1:
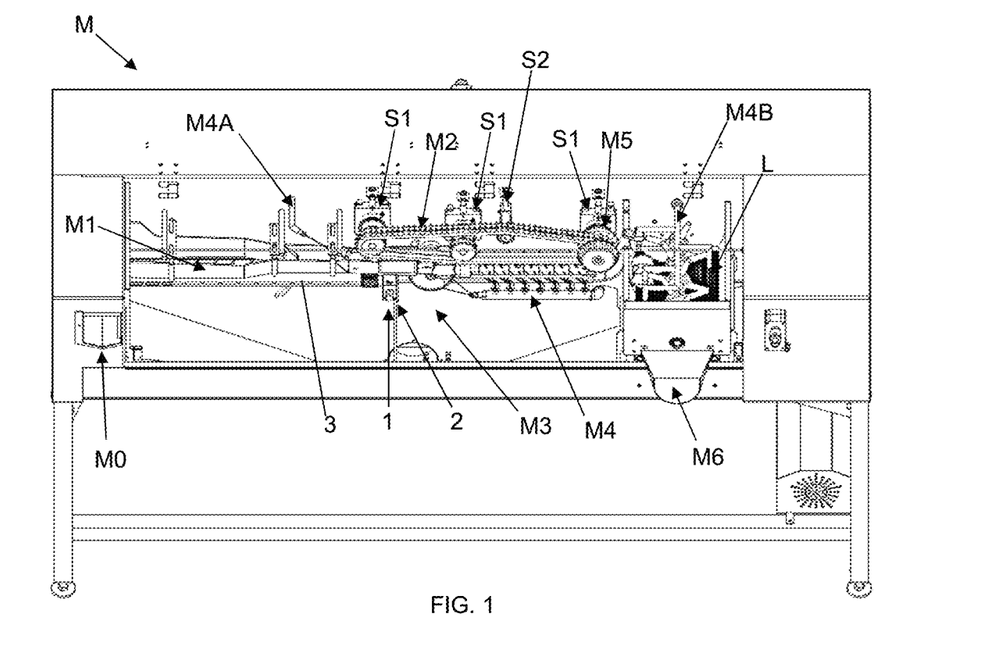
FIG. 1 illustrates a front perspective view of the apparatus M.
Figure 2:
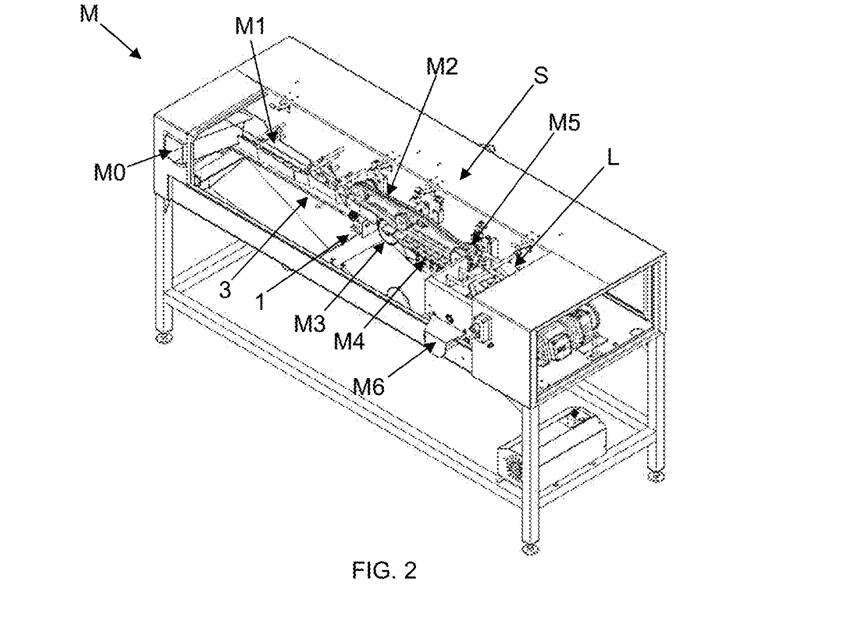
FIG. 2 illustrates a perspective view of the apparatus M, emphasizing its internal components.
Figure 3:
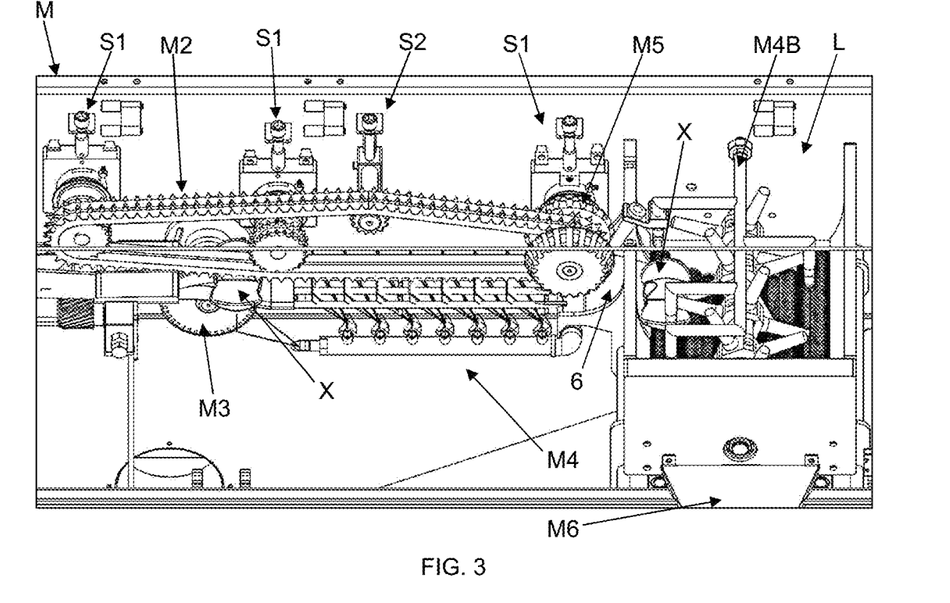
FIG. 3 illustrates an enlarged partial front perspective view of the apparatus M, emphasizing the components that act in the cleaning process in the second half of the apparatus M.

As illustrated in FIG. 3, the apparatus M also comprises a gutter 6 to direct the giblets X to a cleaning system L installed transversely in the apparatus M, enabling the traction of these giblets X from the gutter 6 to the outlet gutter M6.

Figure 4:
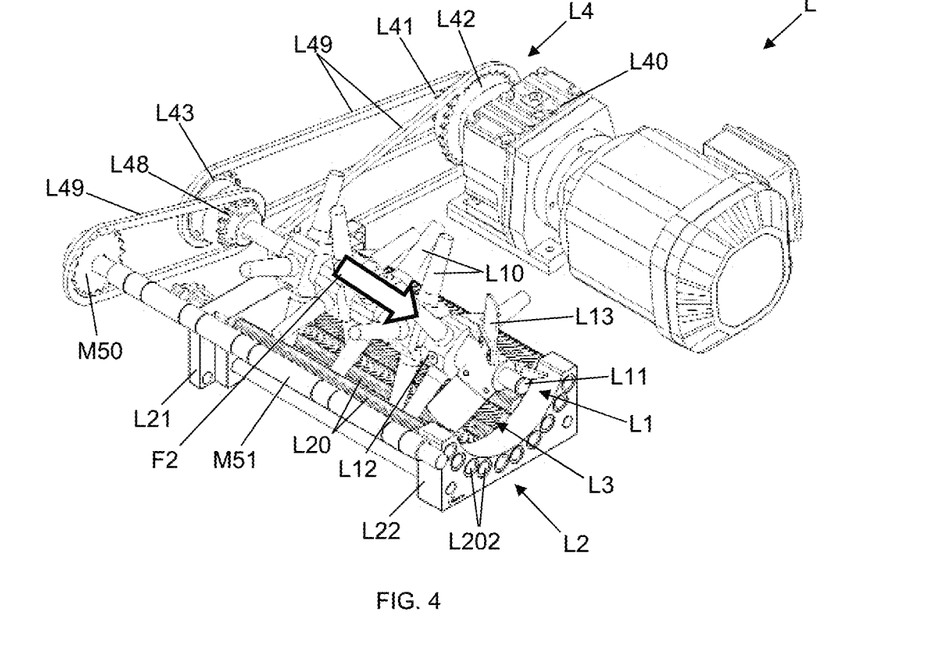
FIG. 4 illustrates a front perspective view of the cleaning system L, evidencing the direction of the second flow of direction (F2).
Figure 5:
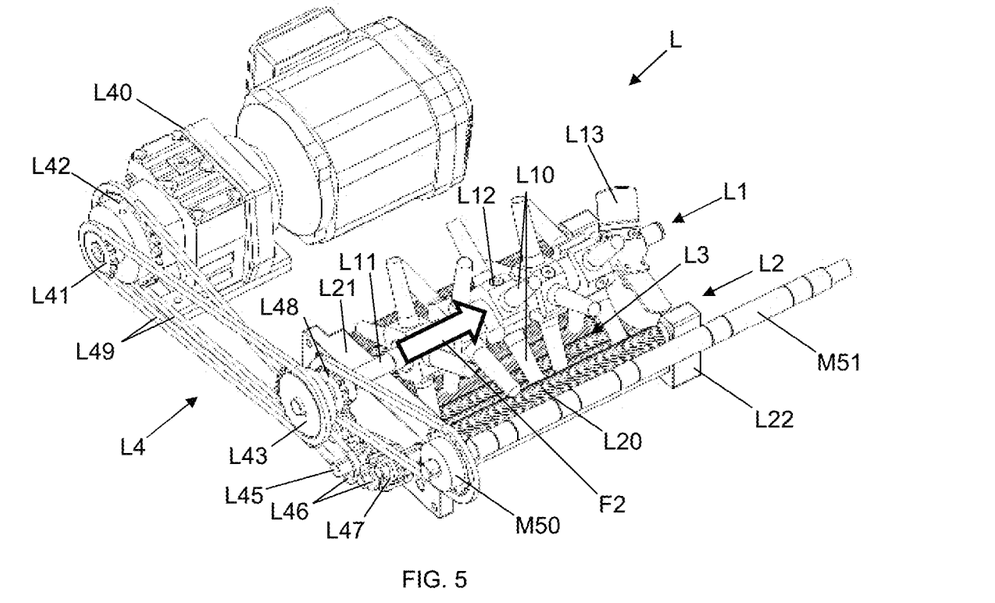
FIG. 5 illustrates a rear perspective view of the cleaning system L, evidencing the direction of the second flow of direction (F2).
Figure 7:
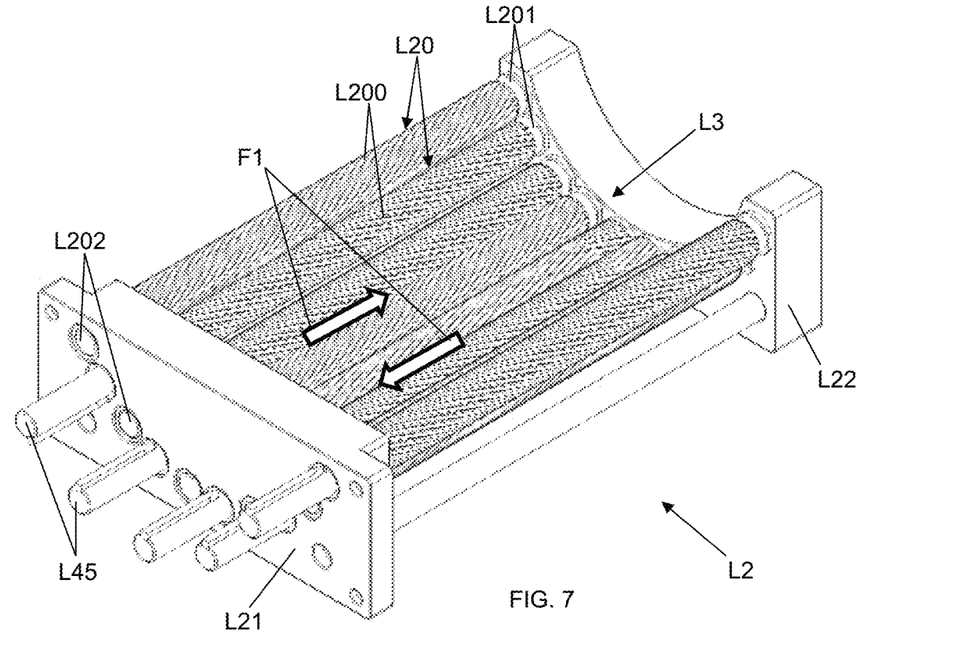
FIG. 7 illustrates a rear perspective view of the cleaning assembly L2, evidencing the direction of the second flow of direction (F1).

As illustrated by FIGS. 4, 5 and 7, the cleaning system L comprises a first directing flow (F1) of giblets X operated to move the giblets X back and forth, in opposite directions to one other, across a guiding region L3 defined by the positioning of cleaning and guiding elements L20 of the cleaning assembly L2.

Thus, the guiding region L3 acts as a cradle for the giblets X that are dumped on the cleaning assembly L2, from the gutter 6, with the first directing flow (F1) of giblets X occurring due to the movement of the cleaning and guiding elements L20 relative to one other, resulting in the first directing flow moving the giblets X back and forth, while they cross the cleaning assembly L2.

This movement of the giblets X back and forth results in a better cleaning of themselves, as it makes these giblets X remain longer on the cleaning assembly L2. In addition, it forces a more intense movement of these giblets X, allowing the cleaning assembly L2 to remove residual parts from different positions on the body of each giblet.

Furthermore, the first directing flow (F1) cooperates with a second directing flow (F2) from the input region to the output region of the cleaning assembly L2, wherein said second directing flow (F2) tends to push the giblets X always forward, towards the exit of the cleaning assembly L2, while the first directing flow (F1) directs the giblets X back and forth.

Thus, the first directing flow (F1) of giblets X is provided by movement of the cleaning and guiding elements L20 relative to one other, while the second directing flow (F2) of giblets X is provided by movement of a plurality of pressing elements L10 installed along and around a rotating shaft L11 of the guiding station L1.

As illustrated in FIG. 7, the cleaning assembly L2 comprises an inlet support L21 and an outlet support L22 that support edges L202 of each cleaning and guiding element L20. In this manner, the cleaning and directing elements L20 are arranged in order to form a cradle for accommodating the giblets X, which defines the guiding region L3.

Preferably, this guiding region L3 is defined in an arc shape, so that the giblets X are moved to the edges of this arc. Nevertheless, they are always forced to return to the bottom, by the action of gravity, preventing the giblets X from fall through the sides of the cleaning assembly L2.

Additionally, as illustrated in FIG. 7, each cleaning and guiding element L20 comprises guiding elements L200 distributed along its entire contact surface L201 with the giblets X, and such guiding elements L200 are responsible for defining the first directing flow (F1) of giblets X, along with the movement of the cleaning and guiding elements L20 relative to one other.

Preferably, as illustrated by FIGS. 4, 5 and 7, the cleaning assembly L2 comprises the cleaning and guiding elements L20 set in groups in a manner that the directions of their respective guiding elements L200 are pointed to opposite sides relative to one other. Thus, each group of cleaning and guiding elements L20 works in an opposite direction relative to the direction of an adjacent group of cleaning and guiding elements L20, as seen in FIG. 7.

Thus, the relative movement of each group of cleaning and guiding elements L20 directs the giblets X to one side, while the adjacent group of cleaning and guiding elements L20 directs the giblets X to the opposite side, generating the forward and backward directing flow (F1).

As a result, the giblets X certainly move over different groups of cleaning and guiding elements L20, and they are directed back and forth along the cleaning assembly L2.

As an example of a preferred embodiment of this invention, each group of cleaning and guiding elements L20 is composed of two cleaning and guiding elements L20, and its guiding elements L200 are arranged diagonally along the contact surface L201 of each cleaning and guiding element L20.

Thus, these guiding elements L200 of each cleaning and guiding element L20 are positioned in directions concurrent with directions of the guiding elements L200 of the other cleaning and guiding element L20 belonging to a same group of cleaning and guiding elements L20, forming arrows that point to one direction or to the opposite one.

However, it would be understood that other forms of guiding elements L200 may be used, as long as they act to point each group of cleaning and guiding elements L20 in opposite directions alternately.

Furthermore, it can be understood that the quantity of cleaning and guiding elements L20 of each group of cleaning and guiding elements L20 may also vary, depending on the characteristics of the giblets X, the shapes of the guiding elements L200, and the very own dimensions of the cleaning and guiding elements L20.

Preferably, each pressing element L10 is configured by a slightly flexible frustoconical body provided with a smooth surface, in order to allow these pressing elements L10 to push the giblets X against the cleaning and guiding elements L20 more efficiently.

Moreover, preferably, the guiding station L1 comprises supports L12 installed along the rotating shaft L11, and each support L12 supports a plurality of pressing elements L10 around the rotating shaft L11 in positions displaced from positions of the pressing elements L10 supported by each adjacent support L12. Furthermore, the guiding station L1 comprises giblet output guiding propellers L13 for moving the giblets X from the guiding region L3 to the outlet gutter M6.

Figure 6:
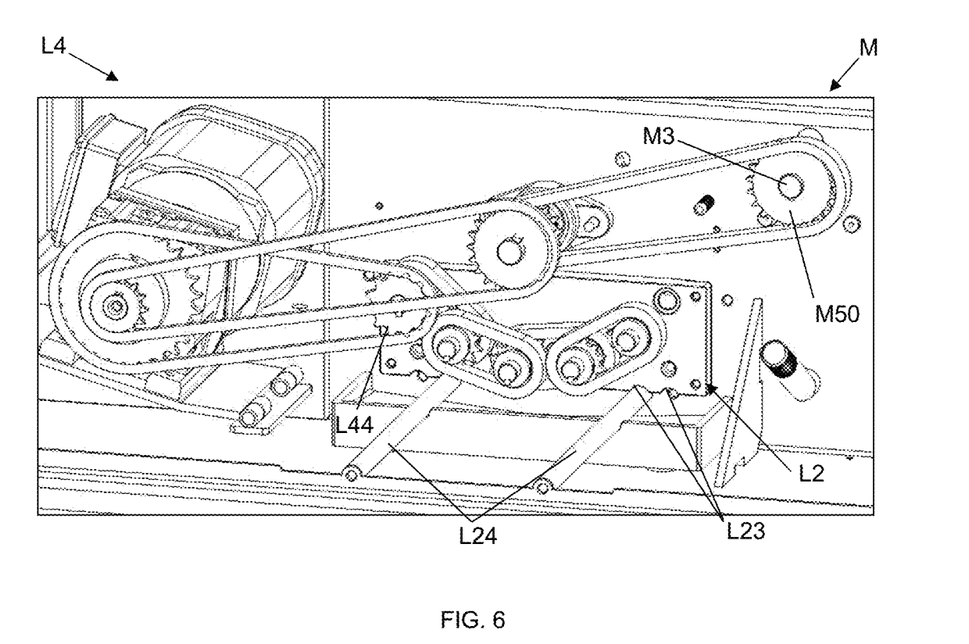
FIG. 6 illustrates an enlarged partial perspective view of the rear region of the apparatus M, emphasizing the installation location of the cleaning assembly L2

As illustrated in FIG. 6, preferably, the cleaning assembly L2 comprises lower guiding ducts L23 for coupling and sliding the cleaning assembly L2 along rail rods L24, providing easier installation/deinstallation of the cleaning assembly L2 in/from the apparatus M. Thus, both assembly and maintenance of the cleaning assembly L2 occur in an easy way, as this cleaning assembly L2 has a considerably high weight and the rail rods L24 allow the beforementioned cleaning assembly L2 to be slid along them.

As illustrated by FIGS. 4 to 6, preferably, the cleaning system L comprises a drive assembly L4 that comprises a gearmotor L40 for moving a first drive gear L41 and a second drive gear L42, both coaxial with one other and directly connected to the gearmotor L40.

Said first drive gear L41 transmits rotation to a first driven gear L43 installed on the rotating shaft L11, for moving the guiding station L1, while the second drive gear L42 transmits rotation to a first gear L44 installed on a shaft L45 of one of the cleaning and guiding elements L20, for moving the cleaning assembly L2.

Furthermore, the movement of other cleaning and guiding elements L20 is promoted by the first gear L44, which transmits rotation to another gear L46 installed on a shaft L45 of a second one of the cleaning and guiding elements L20. Thereby, each another gear L46 transmits rotation to another subsequent gear L46, until a last gear L46 is reached, and the last gear L46 transmits rotation to a peripheral gear L47.

Therefore, each cleaning and guiding element L20, intended to move in the cleaning assembly L2, is moved from a gear L44, L46 or L47 installed on a shaft L45 of these movable cleaning and guiding elements L20. Thus, said gears L44, L46 and L47 transmit rotation to one other, from the first gear L44 to the intermediate gears L46 and, finally, to the peripheral gear L47, positioned on the last movable cleaning and guiding element L20.

Moreover, preferably, the drive assembly L4 comprises a second gear L48 installed on the rotating shaft L11 that transmits rotation to a gear M50 of a shaft M51 responsible for moving the pressing assembly M5 of the apparatus M. Thus, a single driving assembly L4, provided with a single gearmotor L40, is capable of moving the entire system L and also the pressing assembly M5 of the apparatus M.

In addition, preferably, each transmission of rotation between two of the gears L41, L42, L43, L44, L46, L47, L48, i.e., the transmission between each pair of gears, is provided by a chain L49.

Figure 11:
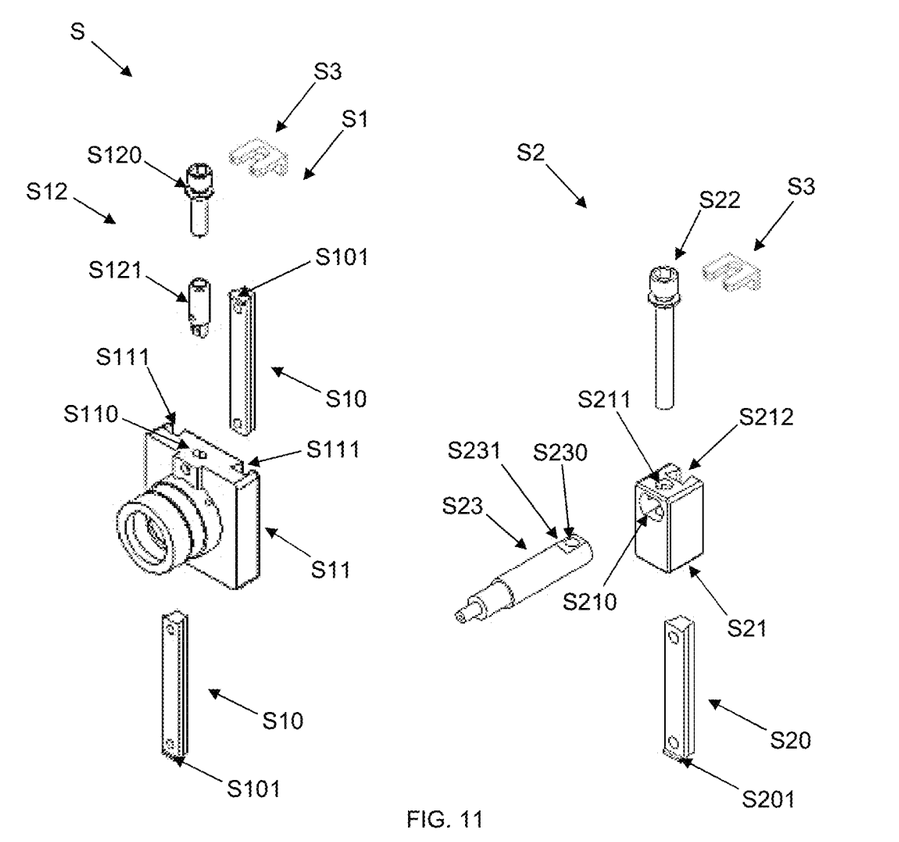
FIG. 11 illustrates an exploded front perspective view of the system S, emphasizing a first bearing assembly S1 and a second bearing assembly S2
Figure 12:
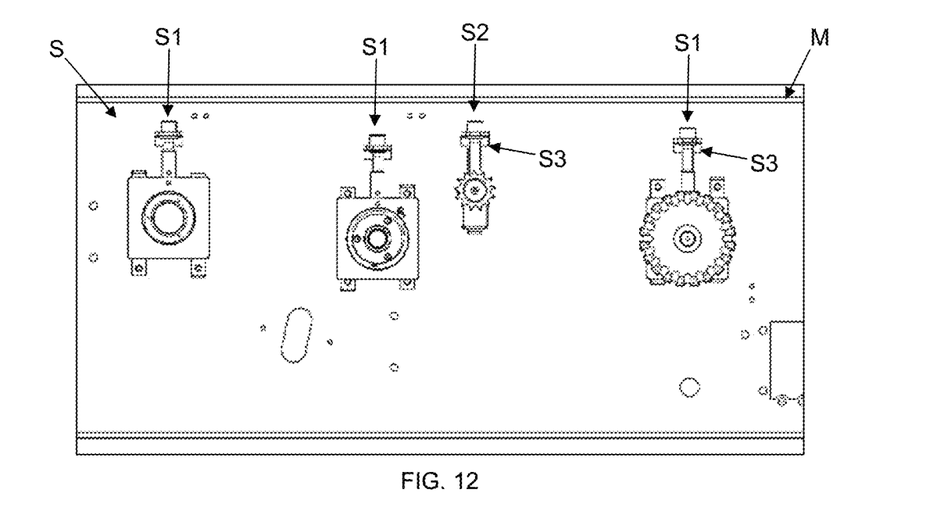
FIG. 12 illustrates an enlarged partial schematic front view of the apparatus M, emphasizing a preferred application of the system S

As illustrated by FIGS. 11 and 12, the apparatus M also comprises a system S for adjusting the bearings of various components of said apparatus M.

The system S comprises three first bearing assemblies S1 and one second bearing assembly S2, for easy adjustment of the position of different specific components of the apparatus M that are installed in these bearing assemblies S1 and S2.

Additionally, as illustrated by FIG. 11, the system S comprises parallel guiding rails S10 for sliding a first body S11 of the first bearing assembly S1, in a manner that said first body S11 can be easily moved throughout these parallel guiding rails S10.

Thus, each parallel guiding rail S10 is conveniently fixed to the apparatus M, and the first body S11 can be moved throughout the parallel guiding rails S10 by the triggering of a first lead screw device S12, which can be easily accessed by an operator (not shown), from the front of the apparatus M and without the need to remove other components from the apparatus, except for the opening of their respective protective covers M70, if there is any.

The first body S11 comprises a hole S110 to connect the first body S11 to the first lead screw device S12. Furthermore, preferably, the first lead screw device S12 comprises a triggering element S120, such as a screw, supported on a retaining support S3 fixed to the apparatus M. The body of the triggering element S120 passes through the retaining support S3, and it is fixed to a connecting element S121, such as a threaded sleeve.

Said connecting element S121 is conveniently statically fixed in the hole S110 of the first body S11 so that the rotation of the triggering element S120 results in the movement of the connecting element S121 throughout the triggering element S120, moving the first body S11 with it.

As illustrated by FIG. 11, the first body S11 comprises parallel ducts S111 to receive the parallel guiding rails S10. Said parallel ducts S111 and parallel guiding rails S10 shapes are complementary to each other, promoting proper fitting and allowing the parallel ducts S111 to slide throughout the parallel guiding rails S10.

Preferably, both parallel ducts S111 and parallel guiding rails S10 have a trapezoidal shape, facilitating the fitting between themselves and allowing the vertical movement of the first body S11, while preventing orthogonal movements of the first body S11 relative to the parallel guiding rails S10.

Furthermore, as illustrated by FIG. 11, the parallel guiding rails S10 comprise first limit stops S101 limiting the movement of the first body S11. Moreover, preferably, each parallel guiding rail S10 comprises a single first limit stop S101. As a preferred embodiment of the invention, a parallel guiding rail S10 may comprise an upper first limit stop S101, while another parallel guiding rail S10 may comprise a lower first limit stop S101.

Additionally, as illustrated by FIG. 11, the system S comprises one single guiding rail S20 to slide a second body S21 of a second bearing assembly S2, in a manner that said second body S21 can be easily moved throughout said single guiding rail S20.

Thus, the single guiding rail S20 is conveniently fixed to the apparatus M, and the second body S21 can be moved throughout the single guiding rail S20 by the triggering of the second lead screw device S22, which can also be easily accessed by an operator (not shown) from the front of the apparatus M and without the need of removing other components from the apparatus, aside from the simple opening of their respective protective covers M70, if there is any.

As illustrated by FIG. 11, the second body S21 comprises a connecting horizontal hole S210 to the beveled end S231 of a shaft S23, in order to prevent rotational movements of said shaft S23 inside the horizontal hole S210.

Furthermore, this beveled end S231 is provided with a first vertical hole S230, while the second body S21 comprises a second vertical hole S211 that communicates with the horizontal hole S210, which is aligned with the first vertical hole S230, in the shaft S23 mounting position through the horizontal hole S210.

Therefore, when the shaft S23 is inserted inside the horizontal hole S210, the two vertical holes S230 and S211 assume positions aligned with each other, allowing the shaft S23 to be connected to the second lead screw device S22.

Said second lead screw device S22 is preferably configured by a screw, which is supported on a retaining support S3 (see FIG. 12) fixed to the apparatus M so that its head is supported on said retaining support S3 while its body simultaneously crosses the retaining support S3 and the second vertical hole S211, allowing it to connect with the first vertical hole S230 of the shaft S23.

Thus, the second lead screw device S22, such as a screw, is conveniently fixed and, preferably, threaded, in the vertical hole S230 of the shaft S23 so that the rotation of the second lead screw device S22 results in the vertical movement of the shaft S23, moving the second body S21 with it as well.

As illustrated by FIG. 11, the second body S21 comprises a single duct S212 for receiving the single guiding rail S20. The single duct S212 and the single guiding rail S20 shapes are complementary to each other, promoting proper fitting and allowing the single duct S212 to slide throughout the single guiding rail S20.

Preferably, both the single duct S212 and the single guiding rail S20 have a trapezoidal shape, facilitating the fitting between themselves and allowing the vertical movement of the second body S21, while preventing orthogonal movements of the second body S21 relative to the single guiding rail S20.

Furthermore, as illustrated by FIG. 11, the single guiding rail S20 comprises at least a second limit stop S201 limiting the movement of the second body S21. Moreover, preferably, the single guiding rail S20 comprises a single second limit stop S201. As an alternative embodiment of the invention, the single guiding rail S20 may further comprise a lower second limit stop S201.

In addition, preferably, the apparatus M comprises a first auxiliary washing assembly M4A facing the region defined between the cleaning cylinders 32 and 42 of the pre-cleaning rollers 3 and 4 and the beginning of the gripping and transporting conveyor chain M2, providing sanitation of this region.

Figure 8:
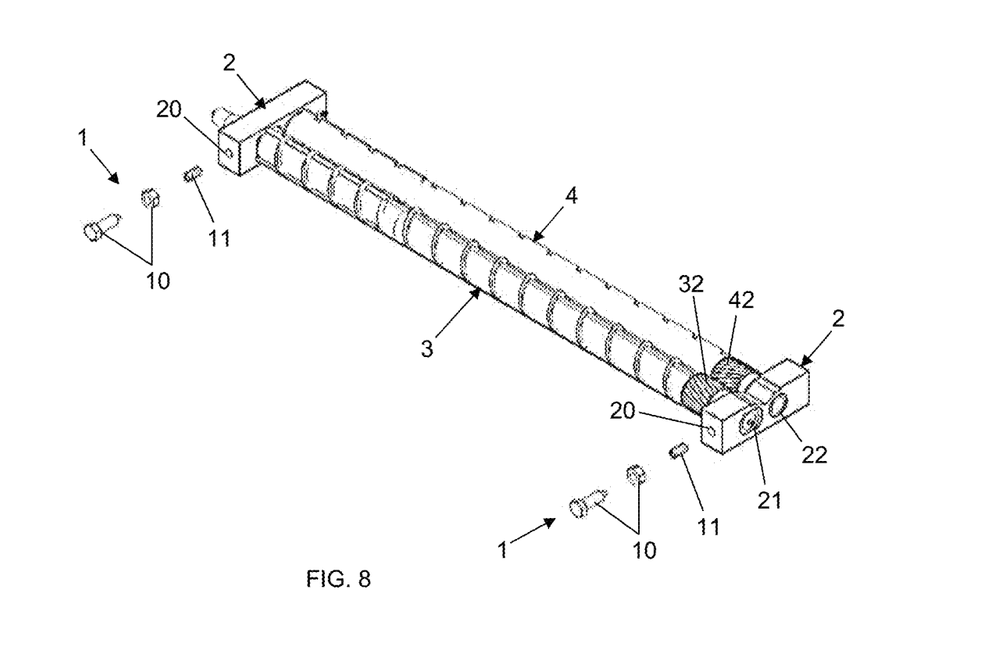
FIG. 8 illustrates a perspective view of a preferred application of the adjusting devices 1
Figure 9:
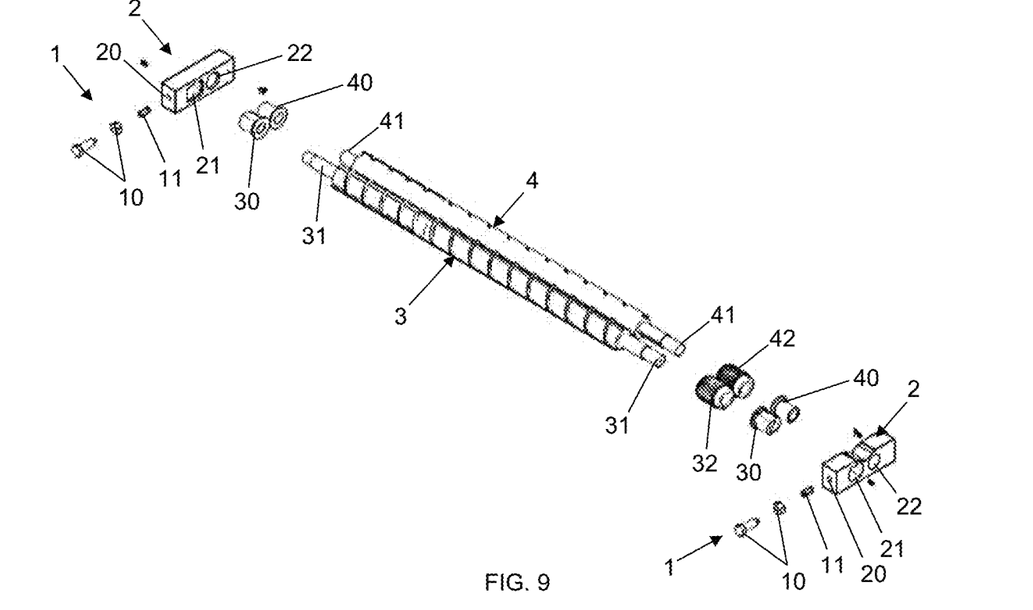
FIG. 9 illustrates an exploded perspective view of a preferred application of the adjusting devices 1

As illustrated by FIGS. 8 and 9, preferably, the apparatus M comprises adjusting devices 1 installed on a pair of self-compensating bearing assemblies 2 to promote adjustment of the position and relative distance between the first pre-cleaning roller 3 and the second pre-cleaning roller 4 of the giblets X.

The adjusting devices 1 are installed in the front region of the apparatus M, in such a way that an operator (not shown) can have easy access to it, and without the hindering from any apparatus M component to this access. Thus, said adjusting devices 1 are set to establish a convenient distance between the pre-cleaning rollers 3 and 4, according to each application needed.

In an embodiment of the invention, in gizzard X cleaning applications, the distance between the pre-cleaning rollers 3 and 4 should vary according to the dimensions of these gizzards X. It is well known for those of ordinary skill in the art of poultry processing that gizzards X begin to wilt after just a few hours since the slaughter of the birds (not shown).

Thus, the time required to transport the gizzards X from the slaughterhouse to the processing facility, where they are processed, directly influences the dimensions of these gizzards X and, consequently, requires adjustment in the distance between the pre-cleaning rollers 3 and 4, thereby processing the gizzards X with higher quality and productivity.

Moreover, as illustrated by FIGS. 8 and 9, each self-compensating bearing assembly 2 comprises a duct 20 that accommodates an adjusting device 1 of the position of the first pre-cleaning roller 3.

Therefore, the adjusting devices 1 allow the self-compensating bearing assemblies 2 to provide a shift in the position of the first pre-cleaning roller 3, which moves relative to the second pre-cleaning roller 4 whenever it is necessary, in a manner that the adjusting devices 1 themselves force the first pre-cleaning roller 3 to return to its initial position as soon as possible.

This displacement of the position of the first pre-cleaning roller 3 occurs mainly when the giblets X contain, inside of them, small solid objects, such as stones or metals previously swallowed by the slaughtered birds (not shown).

Thus, the self-compensating bearing assemblies 2 allow the first pre-cleaning roller 3 to move away from the second pre-cleaning roller 4 when they act to remove these solid objects from the interior of the giblets X, preventing the pre-cleaning rollers 3 and 4 from get stuck. Similarly, as soon as the solid objects are removed from the interior of the giblets X, the adjusting devices 1 act so that the first pre-cleaning roller 3 approaches the second pre-cleaning roller 4 again.

For this purpose, preferably, as illustrated in FIGS. 8 and 9, each self-compensating bearing assembly 2 comprises a first oblong hole 21 to accommodate an adapter sleeve 30 which is slidable inside the first oblong hole 21 and receives one end 31 of the first pre-cleaning roller 3.

In addition, the first oblong hole 21 is interconnected with the duct 20 so that each adjusting device 1 is in direct contact with an adapter sleeve 30 for displacement of the first pre-cleaning roller 3 inside the respective self-compensating bearing assembly 2.

Furthermore, preferably, as illustrated in FIGS. 8 and 9, each adjusting device 1 comprises an adjustable triggering element 10, such as a screw with a nut, capable of regulating its actuation position and its reach inside the duct 20. In addition, each adjusting device 1 also comprises a resilient element 11, such as a spring, arranged in constant contact with the adjustable triggering element 10.

Thus, each resilient element 11 is preferably arranged in contact with an adapter sleeve 30, in such a way that the resilient element 11 allows the adapter sleeve 30 and the first precleaning roller 3 to slide together but forces the adapter sleeve 30 back to its initial position, in the first oblong hole 21 of the self-compensating bearing assembly 2, whenever it is possible.

Furthermore, each self-compensating bearing assembly 2 comprises a hole 22 to accommodate an adapter sleeve 40, which is fixed inside the hole 22 and receives one of the ends 41 of the second pre-cleaning roller 4. Thus, the second pre-cleaning roller 4 rotates around its own axis, without moving inside the self-compensating bearing assemblies 2.

In addition, preferably, the first pre-cleaning roller 3 comprises a cleaning cylinder 32 adjacently arranged to one of the adapter sleeves 30, and the second pre-cleaning roller 4 comprises a cleaning cylinder 42 adjacently arranged to one of the adapter sleeves 40. Thus, the cleaning cylinders 32 and 42 are responsible for effectively removing the residual parts of the giblets X.

Figure 10:
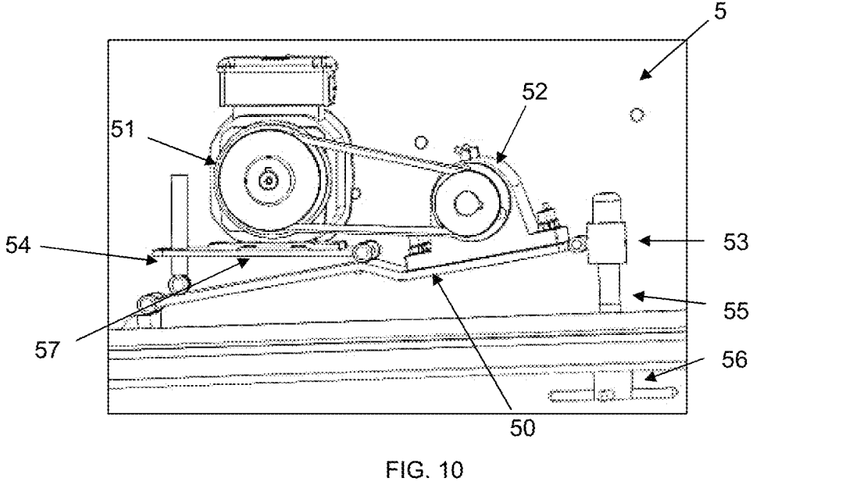
FIG. 10 illustrates an enlarged partial schematic perspective view of a rear region of the apparatus M, emphasizing the adjustment assembly 5

As illustrated by FIG. 10, the apparatus M also comprises an adjustment assembly 5 provided with a main base 50 to support a bearing 52 of the cutting element M3 shaft and a secondary base 57 for supporting a motor 51. The adjustment assembly 5 further comprises a belt tensioning device 54 and a regulating element 53 movable along an adjusting element 55. The adjusting element 55 is provided with a handler 56 used to manually adjusting the relative position of the regulating element 53 along the adjusting element 55. The regulating element 53 is connected with the main base 50, and its movement results in a consequent position adjustment of the bearing 52.

Thus, during the installation of the adjustment assembly 5, the regulating element 53 and the belt tensioning device 54 are manually adjusted for the first and only time. Afterwards, if it is necessary to adjust the position of the cutting element M3, it is not necessary to adjust the tightening of the rotation transmission belt of the motor 51 to the bearing 52, as both are arranged on the main base 50 and the secondary base 57, and the adjustment of the position of the cutting element M3, actuated manually by adjusting the position of the adjusting element 55, is achieved by operating the handler 56, allowing the adjustment assembly 5 to readjust the tightening of the belt automatically.

Figure 14:
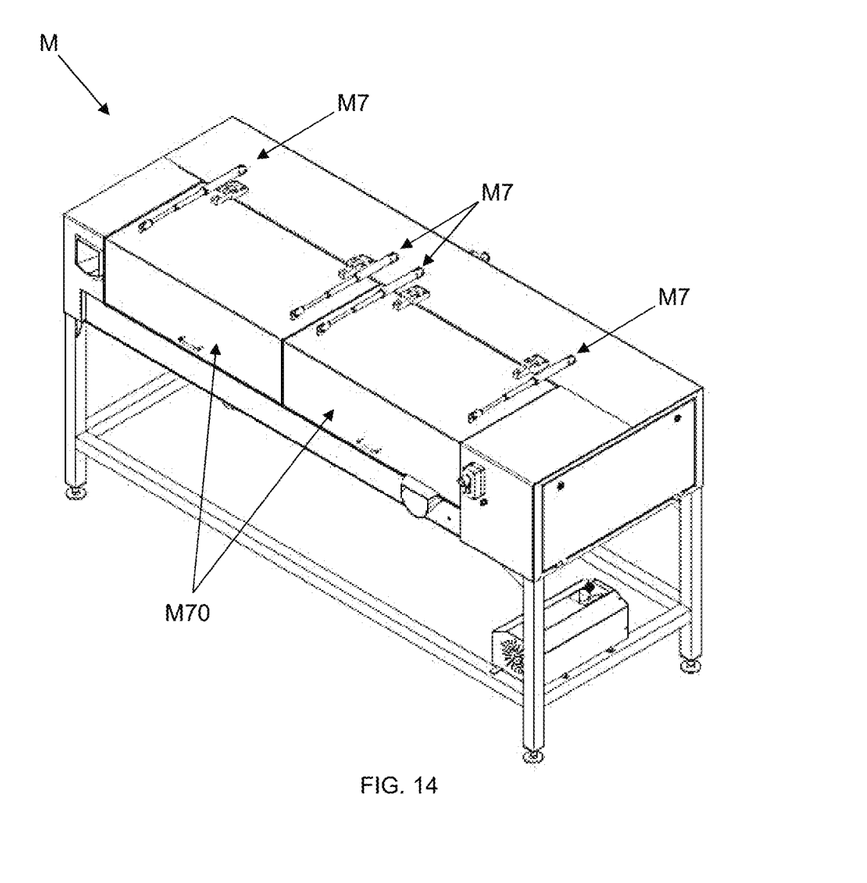
FIG. 14 illustrates a perspective view of the apparatus M, emphasizing the actuating elements M7 installed on the covers M70.

As illustrated by FIG. 14, preferably, the apparatus M also comprises actuating elements M7 for the controlled opening and closing, in intermediate opening positions, of covers M70 of the apparatus M. This ensures operator safety (not shown) and facilitates adjustments inside the apparatus M.

Thus, when an operator (not shown) manually opens or closes the covers M70, said actuating elements M7, such as gas spring pistons, act to smooth the movement of the covers M70, preventing sudden movements and holding them in convenient opening positions, similarly to what occurs with car trunk lids.

The present invention also describes a method for cleaning poultry giblets X, and this method may be applied in an operating apparatus M provided with an inlet gutter M0 and an outlet gutter M6 of giblets X. The apparatus M further comprises a first pre-cleaning roller 3 and a second pre-cleaning roller 4, both arranged under a guiding assembly M1 that directs the giblets X to a gripping and transporting conveyor chain M2 for transporting the giblets X from the pre-cleaning rollers 3 and 4 to a pressing assembly M5, also passing through a cutting element M3 and a washing assembly M4 of giblets X.

Said method comprises the following steps:
(a) feeding the giblets X into the apparatus M through the inlet gutter M0;
(b) conducting the giblets X to the guiding assembly M1, first passing through the pre-cleaning rollers 3 and 4 and then through the cleaning cylinders 32 and 42 for separating the viscera pack (not shown) from the giblets X;
(c) conveying the giblets X, by movement of the gripping and transporting conveyor chain M2, the giblets X preferably initially positioned on the opening gutter M9 and on the opening and cleaning guide M10;
(d) cutting the lower region of the giblets X passing through the cutting element M3, preferably inserted between both slots of the opening gutter M9 and the opening and cleaning guide M10, and adjusted according to the dimensional characteristics of the giblets X of each batch;
(e) passing the giblets X over an opening and cleaning guide M10 and over the washing assembly M4, and washing of the newly opened lower region of these giblets X;
(f) gripping the giblets X by the pressing assembly M5 and separating these giblets X from the gripping and transporting conveyor chain M2;
(g) sliding the giblets X throughout a giblet feeding gutter 6 to a cleaning system L installed transversely in the apparatus M;
(h) orthogonally moving the giblets X in a first directing flow (F1) of giblets X back and forth across a guiding region L3 defined by the positioning of cleaning and guiding elements L20 of a cleaning assembly L2 of the cleaning system L, while a second directing flow (F2) moves the giblets X from the supply region provided by the gutter 6 to the outlet gutter M6;
(i) supplying the cleaned giblets X through the outlet gutter M6;
(j) repeating steps (a) to (i), until the supply of giblets X to be cleaned is interrupted.

Preferably, in (b), a first auxiliary washing assembly M4A, facing the region defined between the ends of the pre-cleaning rollers 3 and 4 and the beginning of the gripping and transporting conveyor chain M2, provides washing of the cleaning cylinders 32 and 42 that separate the giblets X from their respective packages of viscera, cleaning the ends of the pre-cleaning rollers 3 and 4 during this step.

In addition, in (d), preferably, the washing assembly M4 also washes the lower region of the giblets X that are being cut by the cutting element M3, washing the interior of the giblets freshly cut and increasing cleaning efficiency during this step.

Moreover, in (h), the first directing flow (F1) is preferably provided by movement of the cleaning and directing elements L20 relative to one other, and the second directing flow (F2) is preferably provided by movement of a plurality of pressing elements L10 installed along and around a rotating shaft L11 of a guiding station L1.

Finally, in (h), preferably, a second auxiliary washing assembly M4B, facing the cleaning assembly L2, provides cleaning of the cleaning and guiding elements L20 and washing of the giblets X passing through the guiding region L3, washing the giblets X while they are cleaned by the cleaning system L, increasing cleaning efficiency during this step, and maintaining the cleaning and guiding elements L20 sanitized during the apparatus M operation.

The person skilled in the art will readily notice from the description various ways of performing the invention without departing from the scope of the enclosed claims.

What is claimed is:

1. A machine for cleaning poultry offal, comprising:
(1) an inlet gutter and an outlet gutter for giblets,
(2) a first pre-cleaning roller and a second pre-cleaning roller for the giblets, the pre-cleaning rollers arranged under a guiding assembly that directs the giblets to a gripping and transporting conveyor chain for transporting the giblets from the pre-cleaning rollers to a pressing assembly, a cutting element and a washing assembly for the giblets;
(3) a gutter, directing the giblets to a cleaning system transversely positioned in the machine, wherein the cleaning system comprising:
(a) a guiding station of giblets set against a cleaning assembly, both moved by a drive assembly,
(b) a first directing flow of giblets operated to move the giblets back and forth across a guiding region defined by a positioning of cleaning and guiding elements of the cleaning assembly, wherein
the first directing flow is provided by movement of the cleaning and guiding elements relative to one other and the first directing flow cooperates with a second directing flow of giblets, provided by movement of a plurality of pressing elements installed along and around a rotating shaft of the guiding station, and wherein
the second directing flow is operated to move the giblets through the gutter from a giblets supply region to a region of the outlet gutter.

2. The machine according to claim 1, wherein the cleaning assembly comprises:
an inlet support and an outlet support that support the edges of each cleaning and guiding element, wherein:
each cleaning and guiding element comprises guiding elements, distributed along an entire contact surface of each cleaning and guiding element;
the cleaning and guiding elements set in groups, wherein the respective guiding elements belonging to different groups of cleaning and guiding elements are pointed in opposite directions to each other, and wherein
each group of cleaning and guiding elements works in an opposite direction to an adjacent group of cleaning and guiding elements; and
lower guiding ducts for coupling and sliding the cleaning assembly along rail rods.

3. The machine according to claim 2, wherein each group of cleaning and guiding elements comprises:
two cleaning and guiding elements with the guiding elements arranged diagonally along the entire contact surface of each cleaning and guiding element, wherein
the guiding elements of each cleaning and guiding element are positioned in directions concurrent with directions of the guiding elements of the other cleaning and guiding element belonging to the same group of cleaning and guiding elements.

4. The machine according to claim 1, wherein the guiding station comprises:
supports installed along the rotating shaft, wherein
each support is used to support the plurality of pressing elements around the rotating shaft in positions displaced from positions of the pressing elements supported by each adjacent support;
giblet outlet guiding propellers that move the giblets from a giblets guiding region to the outlet gutter.

5. The machine according to claim 1, wherein the drive assembly comprises:
a geared motor for moving a first drive gear and a second drive gear, both coaxial with one other, wherein
the first drive gear transmits rotation to a first driven gear installed on the rotating shaft;
the second drive gear transmits rotation to a first gear installed on a shaft of one of the cleaning and guiding elements, wherein
the first gear transmits rotation to a first subsequent gear installed on a shaft of a second one of the cleaning and guiding elements, and
the first subsequent gear transmits rotation to a second subsequent gear until a last subsequent gear is reached, and the last subsequent gear transmits rotation to a peripheral gear;
a second gear installed on the rotating shaft that transmits rotation to a gear of a shaft for moving the pressing assembly,
wherein each rotation transmission between each pair of gears that are connected one to another is provided by a chain.

6. The machine according to claim 1, further comprising:
a system for adjusting bearing assemblies, wherein the system comprises:
parallel guiding rails for sliding a first body of a first bearing assembly, wherein
each parallel guiding rail is fixed to the machine, and the first body moves throughout the parallel guiding rails by the triggering of a first lead screw device, supported on a first retaining support; and
a single guiding rail for sliding a second body of a second bearing assembly, wherein the single guiding rail is fixed to the machine, and the second body moves throughout the single guiding rail by the triggering of a second lead screw device, supported on a second retaining support.

7. The machine according to claim 6, wherein the first body comprises a hole connecting the first body to the first lead screw device, wherein
the first lead screw device comprises a triggering element, such as a screw, supported by the first retaining support fixed to the machine, wherein the triggering element is fixed to a connecting element, such as a threaded sleeve, fixed in the hole of the first body;
the second body comprises a connecting horizontal hole to the beveled end of a shaft, wherein
the beveled end is provided with a first vertical hole, and the second body comprises a second vertical hole communicating with the connecting horizontal hole, wherein the second vertical hole is aligned with the first vertical hole, in the shaft mounting position through the horizontal hole, and
the shaft is connected with the second lead screw device supported by the second retaining support fixed to the machine, wherein the second lead screw device crosses the second vertical hole and connects with the first vertical hole.

8. The machine according to claim 7, wherein the first body comprises parallel ducts to receive the parallel guiding rails, wherein the parallel guiding rails comprise first limit stops limiting the movement of the first body; and
the second body comprises a single duct to receive the single guiding rail, wherein the single guiding rail comprises at least a second limit stop limiting the movement of the second body.

9. The machine according to claim 1, further comprising:
an adjustment assembly provided with a main base to support a bearing of the cutting element and a secondary base for supporting a motor, wherein the adjustment assembly comprises:
a belt tensioning device and an adjusting element for positioning a regulating element of the position of the cutting element, and wherein
the regulating element is connected with the main base, and
the adjusting element comprises a handler actuated to adjust the position of the regulating element along the adjusting element.

10. The machine according to claim 1, further comprising actuating elements for controlling the opening, closing and intermediate opening positions of covers of the machine.

11. A method for cleaning poultry giblets, applied in a machine having an inlet gutter and an outlet gutter for the giblets, a first pre-cleaning roller and a second pre-cleaning roller both arranged under a guiding assembly that directs the giblets to a gripping and transporting conveyor chain for transporting the giblets from the pre-cleaning rollers to a pressing assembly, a cutting element and a washing assembly, wherein the method comprises the following steps:

(a) feeding the giblets into the machine through the inlet gutter;
(b) conducting the giblets through the pre-cleaning rollers to the guiding assembly;
(c) conveying the giblets by movement of the gripping and transporting conveyor chain;
(d) cutting the lower region of the giblets passing through the cutting element;
(e) passing the giblets over the washing assembly and washing the newly opened lower region of these giblets;
(f) gripping the giblets by the pressing assembly and separating the giblets from the gripping and transporting conveyor chain;
(g) sliding the giblets throughout a giblet feeding gutter to a cleaning system installed transversely in the machine;
(h) orthogonally moving the giblets in a first directing flow of giblets back and forth across a guiding region defined by the positioning of cleaning and guiding elements of a cleaning assembly of the cleaning system, while a second directing flow moves the giblets from a supply region provided by the giblet feeding gutter to the outlet gutter;
(i) supplying the cleaned giblets through the outlet gutter; and
(j) repeating steps (a) to (i) until the supply of giblets to be cleaned is interrupted.

12. The method according to claim 11, wherein in step (b) a first auxiliary washing assembly, facing a region defined between the ends of the pre-cleaning rollers and the beginning of the gripping and transporting conveyor chain, provides washing of cleaning cylinders that separate the giblets from their respective packages of viscera.

13. The method according to claim 11, wherein in step (d) the washing assembly also washes the lower region of the giblets that are being cut by the cutting element.

14. The method according to claim 11, wherein in step (h) the first directing flow is provided by movement of the cleaning and guiding elements relative to one other, and the second directing flow is provided by movement of a plurality of pressing elements installed along and around a rotating shaft of a guiding station.

15. The method according to claim 11, wherein in step (h) a second auxiliary washing assembly, facing the cleaning assembly, provides cleaning of the cleaning and guiding elements and washing of the giblets passing through the guiding region.

* * * * *